(12) United States Patent
Nelson et al.

(10) Patent No.: US 7,448,051 B2
(45) Date of Patent: Nov. 4, 2008

(54) PRINTER TRAY PICKER

(75) Inventors: Westin W. Nelson, Dayton, MN (US); Steven R. Jensen, Ramsey, MN (US)

(73) Assignee: Rimage Corporation, Minneapolis, MN (US)

( * ) Notice: Subject to any disclaimer, the term of this patent is extended or adjusted under 35 U.S.C. 154(b) by 784 days.

(21) Appl. No.: 11/076,017

(22) Filed: Mar. 9, 2005

(65) Prior Publication Data
US 2005/0213490 A1   Sep. 29, 2005

Related U.S. Application Data

(60) Provisional application No. 60/551,508, filed on Mar. 9, 2004.

(51) Int. Cl.
*G11B 17/03* (2006.01)

(52) U.S. Cl. ........................ 720/601; 369/292

(58) Field of Classification Search .............. 720/601; 369/292; 347/222; 101/37
See application file for complete search history.

(56) References Cited

U.S. PATENT DOCUMENTS

| | | | |
|---|---|---|---|
| 6,424,603 B1 * | 7/2002 | Matsushima | 369/30.42 |
| 6,580,444 B1 * | 6/2003 | Drynkin et al. | 347/171 |
| 6,760,052 B2 * | 7/2004 | Cummins et al. | 347/171 |
| 6,990,674 B1 * | 1/2006 | Cummins et al. | 720/623 |
| 7,127,725 B2 * | 10/2006 | Lee | 720/600 |
| 7,305,684 B2 * | 12/2007 | Klein | 720/619 |
| 2005/0160435 A1 * | 7/2005 | Hagstrom | 720/601 |

* cited by examiner

*Primary Examiner*—Angel A Castro
(74) *Attorney, Agent, or Firm*—Leffert Jay & Polglaze, P.A.

(57) ABSTRACT

A multi function recorder and printer feeds discs to be processed through a gravity feed system reducing idle time of a recorder. A drive mounting system allows easy replacement and upgrade of drives without recalibration of the system. A passive picker moves discs between components.

15 Claims, 16 Drawing Sheets

PRINTER TRAY PICKER

RELATED APPLICATION

This application claims the benefit of U.S. Provisional Application No. 60/551,508, filed on Mar. 9, 2004, hereby incorporated herein in its entirety by reference.

FIELD

The present invention relates generally to digital discs and in particular the present invention relates to processing and handling of digital discs.

BACKGROUND

Digital discs are used as a storage medium for digital information. The data is stored on the disc by varying the optical characteristics of the disc. This digital information can be any type of data, such as, but not limited to, audio, image, photo and/or video information. In other words, the digital data stored on a compact disc can vary from disc to disc. Different types of compact discs can be provided, a traditional type of compact disc is manufactured using a plastic mold operation. Each compact disc manufactured using the same mold contains the same digital information. As such, large production runs of compact discs which contain the same information, such as a musical composition, are manufactured in an economical manner by using a molding process.

A different type of compact disc which is commercially available is a recordable compact disc. This type of disc is manufactured such that it does not contain data thereon, but can be programmed after it is manufactured. The optical characteristics, therefore, of the compact disc are modified after it is fabricated depending upon the data that is stored on the disc. In the context of the present invention, it is to be understood that reference to a compact disc (CD) includes but is not limited to Compact Disc Recordable "CD-R", Compact Disc Readable "CD-RW", CD-ROM, CD-PROM, Digital Versatile Disc "DVD", DVD–R, DVD+R, DVD–RAM, DVD–RW, DVD+RW, or any disc for data storage.

To identify the data stored on a compact disc, a label is often printed on one side of the compact disc. For large manufacturing runs of a common compact disc, a silk screen process is often used to apply the label to the compact disc. For small production runs of compact discs, such as those using recordable compact discs, a silk screen operation may not be economical. A custom printing operation, therefore, can be employed to print a custom label on each compact disc. See for example U.S. Pat. No. 5,734,629 entitled "CD Transporter" issued Mar. 31, 1988 for a description of a compact disc transporter which can be used to move a compact disc between a data recorder and a printer, and which allows for automated processing of recordable compact discs. This transporter moves a single compact disc at a time between stations and places completed compact discs in a stack.

Many transporters require an active picker or gripper for moving compact discs between the various components of a transporter. This adds to complexity and cost of such transporters. For small runs of compact discs, such transporters may not be economical. Further, many transporters are large and do not fit well within a small office of home environment.

Still further, typical loading and unloading systems using pickers have recorder downtime due to a picker which is feeding the recorder having multiple tasks to accomplish. For example, a disc to be recorded is placed in a recorder by a picker. When the recording is finished, the tray opens, and the picker moves the disc to the next station or component of the device. Then, the picker retrieves a blank disc for recording and places it in the recorder. During the time that the picker is moving the first disc and retrieving the second disc, the recorder sits idle.

There are many different CD and DVD recorders and readers. Many manufacturers make such products. In a transporter, there are often precise placements and orientations that are needed so that disc production is smooth and requires little if any intervention by a user once the process has started. Typical transporters require precision hand placement of recorders and the like into position within a system, further adding to the labor required to produce and modify such systems. Manufacturers are also continuously striving to upgrade drives to make them more efficient and faster. As each upgrade evolves, often the dimensions of the recorders change. While this change may not be large, the precision placement of recorders in transporters may lead to difficulty for a user wishing to replace a drive.

For the reasons stated above, and for other reasons stated below which will become apparent to those skilled in the art upon reading and understanding the present specification, there is a need in the art for a transporter having a small footprint, and for a transporter that provides reliable yet economical service. There is a further need in the art for a simplified process for mounting a new or upgraded drive within a transporter system.

SUMMARY

The above-mentioned problems with drive replacement, size and cost of transporters, and other problems are addressed by the present invention and will be understood by reading and studying the following specification.

DETAILED DESCRIPTION

Figure 1:
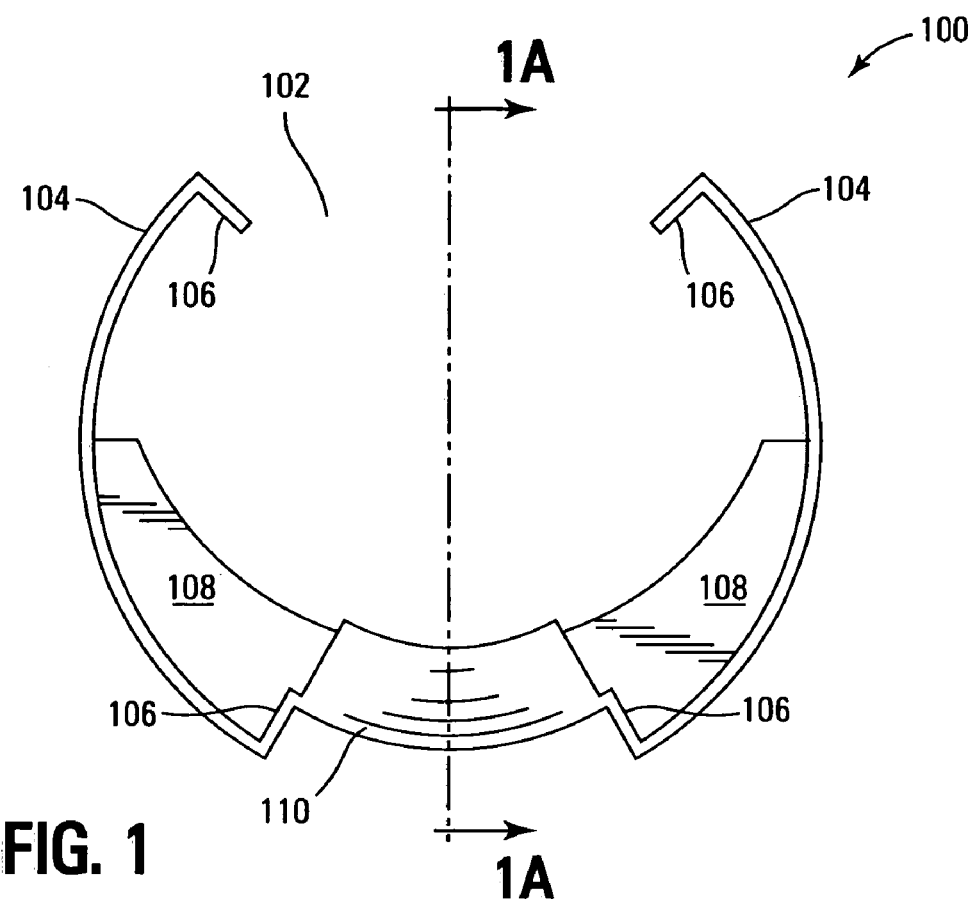
FIG. 1 is a front elevation view of an input bin according to one embodiment of the present invention.

In the following detailed description of the invention, reference is made to the accompanying drawings that form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

The following detailed description is, therefore, not to be taken in a limiting sense, and the scope of the present invention is defined only by the appended claims, along with the full scope of equivalents to which such claims are entitled.

The various embodiments of the present invention have the capability, among other things, to record and print on CDs, and to do so without an active picker. Further, the embodiments of the present invention reduce idle time for a recorder. This is accomplished in various embodiments by providing a gravity feed delivery system of discs to a recorder, and using an angled motion picker to move discs.

Figure 1A:
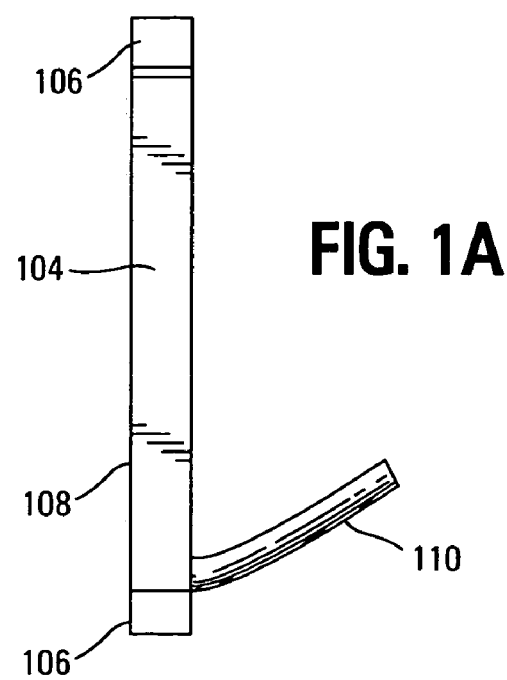
FIG. 1A is a view taken along line 1A-1A of FIG. 1.

FIG. 1 shows a front elevation view of one embodiment 100 of an input bin. Input bin 100 comprises a disc bin 102 that can hold a number of discs. Input bin has a pair of side walls 104 that each have disc holding fingers 106 which serve to hold discs in the bin in generally close alignment with one another. Input bin 100 also has a back wall 108 that serves as a rest against which a disc to be picked from the input bin 100 rests in generally parallel position with the back wall 108. An extension 110 of input bin 100 extends from the back wall 108 to form a cradle that aligns a plurality of discs so that the stack is properly aligned for picking, as will be discussed in further detail below. The extension 110 is more clearly seen by also referring to FIG. 1A. Extension 110 is generally perpendicular to back wall 108 where extension 110 connects with back wall 108. Extension 110 extends from back wall 108 substantially perpendicular to back wall 108 for a distance approximately equal to that of the thickness of six discs, and then begins to curve upward to form a cradle for holding a remainder of a stack of discs. In another embodiment, the extension has no flat surface, but instead slopes upward from the back wall from the connection point to the back wall.

Figure 1B:
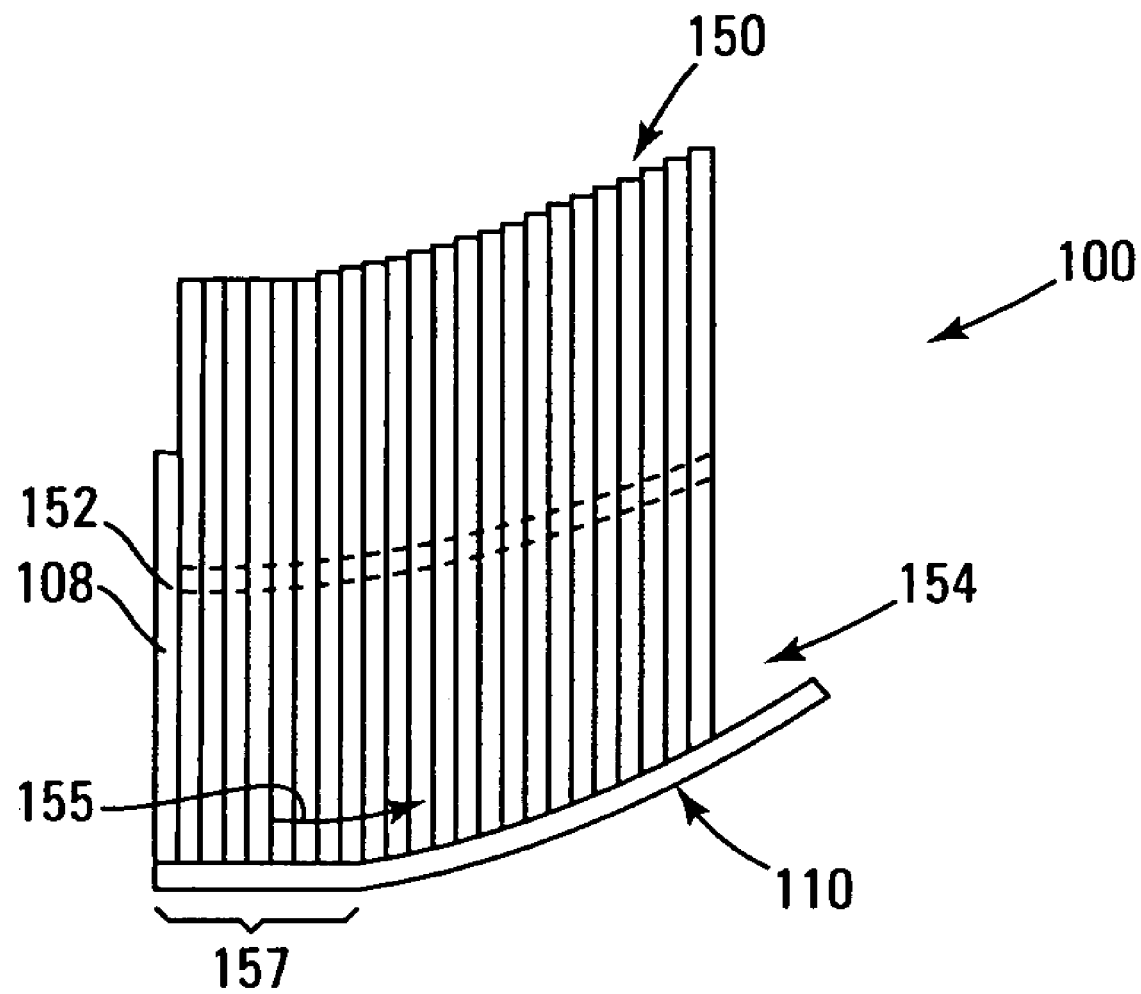
FIG. 1B is a partial side elevation view of an input bin according to another embodiment of the present invention.

As is shown in FIG. 1B, a stack of discs 150 is shown in position on an input bin such as input bin 100. The input bin is shown with the side walls 104 cut away, so that only the discs 150, the back wall 108, and the extension 110 are shown in detail. When discs are to be picked from the input bin 100, a singulator (described in greater detail below) picks a disc at the general location 152. In that region of the input bin, the discs 150 are aligned substantially flush to each other and parallel to back wall 108. The curvature of extension 110 serves to maintain a pressure in the general direction of arrow 154 of the bottom of the stack of discs 150 toward the back wall 108. This pressure assists in keeping the discs at or near the back wall 108 in a favorable picking position.

Discs can rock and move out of proper picking orientation when stacked, especially when stacked substantially vertically. In a near vertical orientation, the bottom of a stack of discs has forces that tend to push the discs outward in the direction of arrow 155 shown in FIG. 1B. The design of the input bin 100 forces the bottom of the stack 150 to be pushed toward the back wall 108 in the direction of arrow 154. The flat section 157 of extension 110, combined with the pressure in the direction of arrow 154 due to the geometry of the extension 110, keeps approximately 6 discs in true picking position for picking by a singulator (described below) at position 152.

Figure 2:
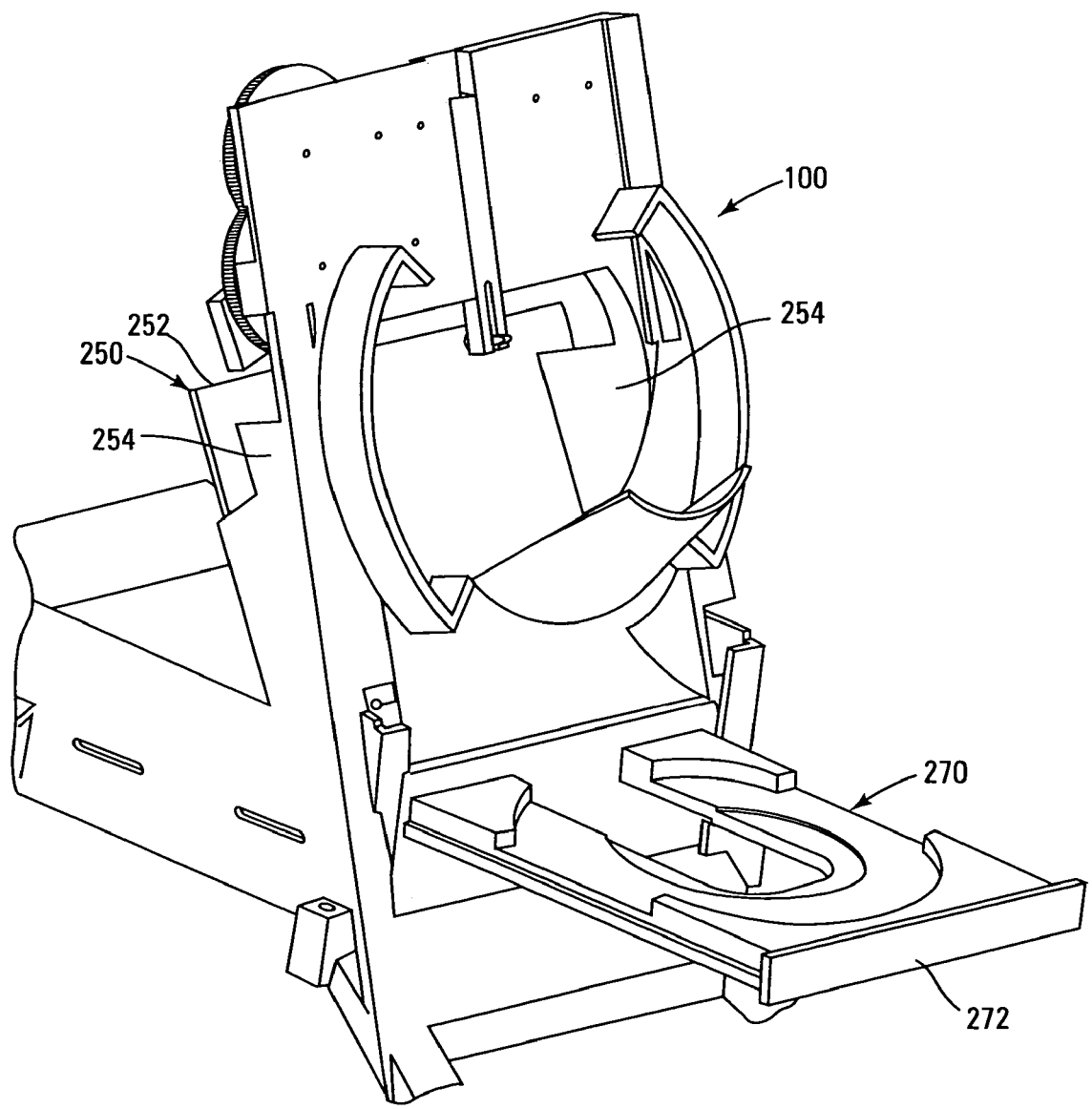
FIG. 2 is a perspective view of an input bin, singulator, feed chute, and recorder according to another embodiment of the present invention.
Figure 2A:
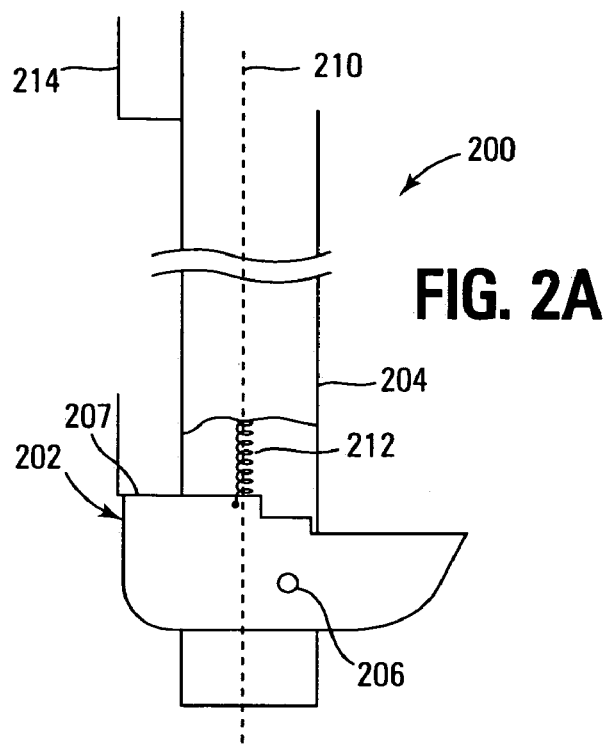
FIG. 2A is a detailed partial cutaway view of the singulator of FIG. 2 according to another embodiment of the present invention.
Figure 2B:
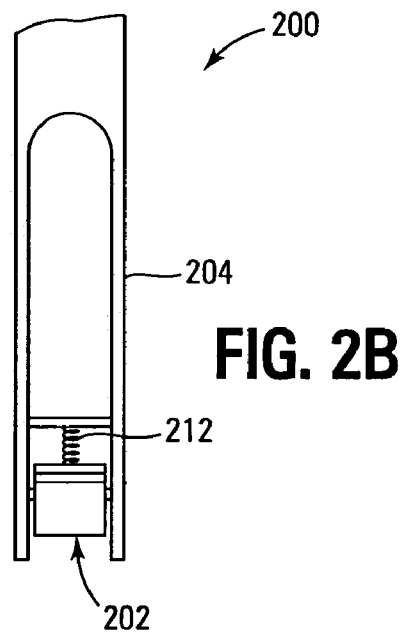
FIG. 2B is a front elevation view of the singulator of FIG. 2A.
Figure 2C:
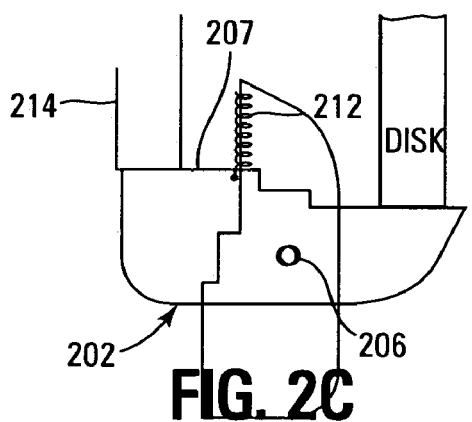
FIGS. 2C, 2D, and 2E are partial views of the motion of a singulating member according to another embodiment of the present invention.
Figure 2D:
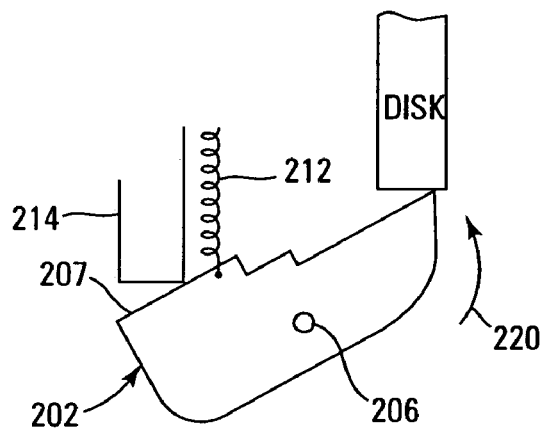
Figure 2E:
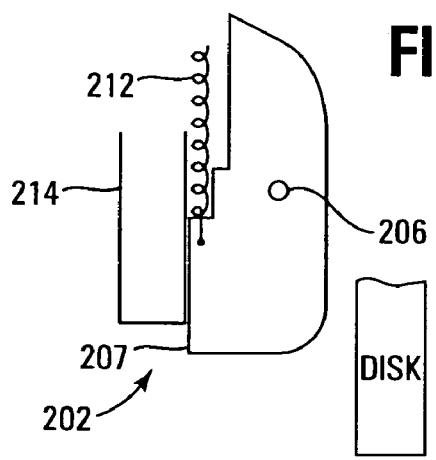

Referring now to FIG. 2, a perspective view of an input bin 100 in place on a part of a larger apparatus is shown. FIG. 2 also shows a singulator 200, a feed chute 250, and a disc recorder or verifier 270. Singulator 200 picks a disc from a stack of discs such as stack 150 which are in the input bin, and drops the disc into chute 250, and gravity feeds the disc directly to the recorder or verifier 270 drawer 272.

The singulator 200 is described in greater detail also referring to FIGS. 2A, 2B, 2C, 2D, and 2E. The singulator comprises a rotatable disc singulating member 202 pivotally connected to singulator arm 204 at pivot point 206. The singulating member 202 has a flat disc holding surface 208 for supporting a disc during singulation. The singulating member 202 flat surface 208 is normally biased to a position in which the flat surface 208 is substantially perpendicular to the direction of travel of the singulator during operation, that direction indicated by directional arrow 210. The biasing is accomplished in one embodiment using extension spring 212 which is connected to bias the singulating member to its normal position in which flat surface 208 is substantially perpendicular to axis 210. The entire singulator arm 204 and singulating member 202 moves on an axis collinear with axis 210.

Any suitable movement mechanism for creating a linear movement of the singulator arm 204 and singulating member 202 is sufficient for the purposes of the embodiments of the singulator 200. Those skilled in the art will immediately recognize that such drive mechanisms include by way of example only and not by way of limitation, to rack and pinion mechanisms, pulley and belt mechanisms, geared drive mechanisms, and the like.

In operation, the singulator 200 works as follows. The singulator is actuated and moves the singulator arm 204 to a position in which the singulating member 202 has its flat surface 208 extended within a center opening of a disc. The sizing of the singulating member and its position within the arm 204 is designed so that a single disc is in contact with the flat surface 208 when the singulator arm 204 is in this position (see FIG. 2C). In this position, a single disc is removed from the back of the stack of an input bin such as input bin 100 described above. The disc is lifted by the singulator 200 as the singulator arm 204 and singulating member 202 move along the axis 210. The disc is lifted to a point located so as to allow the disc to fall into a feed chute (described later) when the singulating member 202 is retracted. In one embodiment, retraction is accomplished by rotating the singulating member 202 about pivot point 206 in a direction indicated by arrow 220 (see FIG. 2D). In this embodiment, a stationary pivot actuator 214, positioned on the singulator 200 in the path of travel of surface 207 of the singulating member 202, contacts the surface 207 of singulating member 202 as the arm 204 and member 202 travel along axis 210 (see FIG. 2C). As the singulating member 202 and arm 204 continue to move along axis 110, the stationary actuator 214 causes the singulating member 202 to pivot in the direction of arrow 220, about pivot point 206. Eventually, the travel of singulator arm 204 and singulating member 202 force member 202 to be rotated sufficiently to allow a carried disc to drop off of flat surface 208 into a feed chute (See FIG. 2E and below).

Feed chute 250 is in one embodiment configured as a portion of input bin 100. In other embodiments, feed chute 250 may be a stand alone chute, or may alternatively be a part of a singulator such as singulator 200, or of an entire apparatus, without departing from the scope of the invention.

Feed chute 250 comprises in one embodiment a angled back member 252 and side walls 254. In conjunction with a singulator such as singulator 200, the chute functions to feed by way of gravity, a disc from the singulator 200 to a tray 272 of recorder or verifier device 270. When the disc is dropped off of the flat surface 208 of the singulating member 202, the disc falls into chute 250, and slides along back member 252 and between side walls 254. Gravity pulls the disc downward into the chute, and the chute directs the disc to a waiting tray such as tray 272. As such, no active picker is required to position a disc into a recorder or the like.

Once the disc is in the recorder or the like, it is recorded, or written, or rewritten, as is desired. When that process has completed, the tray 272 opens once again, and the disc is transported by a picker to its next destination in the apparatus.

Figure 3:
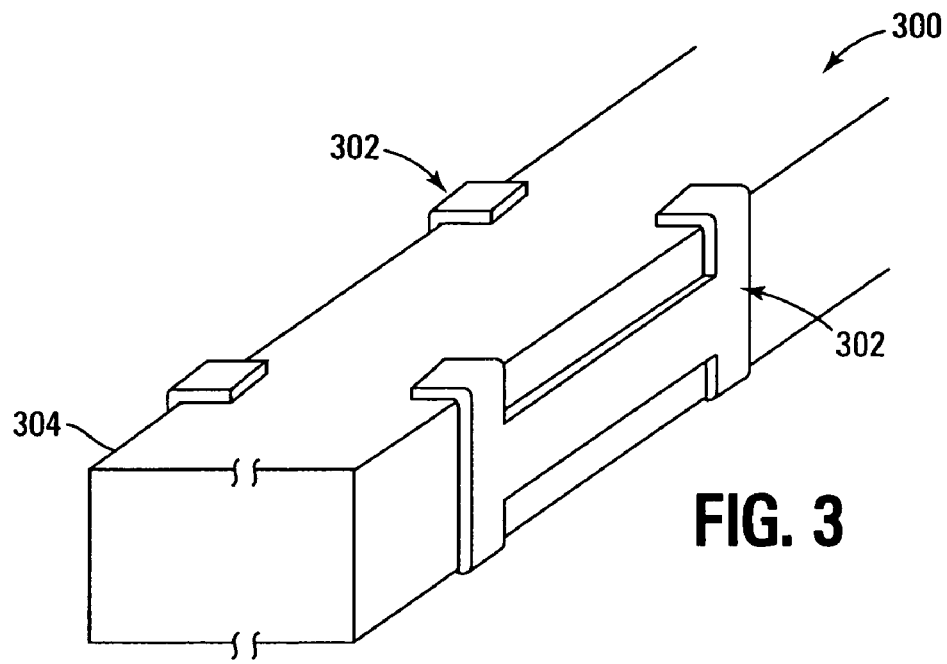
FIG. 3 is a view of a drive mounting system according to another embodiment of the present invention.

On embodiment of a system 300 for mounting drives such as recorder or verifier 270 is shown in greater detail in FIG. 3. Drive mounting system (DMS) 300 comprises in one embodiment a pair of sleeves 302 sized to fit into an oversized drive bay sized to accommodate all expected to be used drives. The sleeves are designed to have external dimensions that fit the oversized drive bay. The internal dimensions of the sleeves can be varied to accommodate different sized drives so as to line up the drive tray in the same position on a system such as system 400 described below no matter what the drive size is. For each individual drive that is not sized to the dimensions of the drive bay, a pair of sleeves 302 is used. In one embodiment, the sleeves 302 are color coded so that each individual drive manufacturer drive, such as drive 304, is associated with a set of colored sleeves 302 that are used to provide a unique solution for each individual drive 304. The sleeves 302 are fitted to the outside of a drive 304 which is then inserted into the oversized drive bay.

Figure 3B:
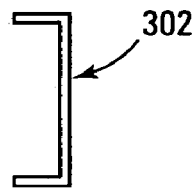
FIG. 3B is a front elevation view of the sleeve of FIG. 3A.
Figure 3A:
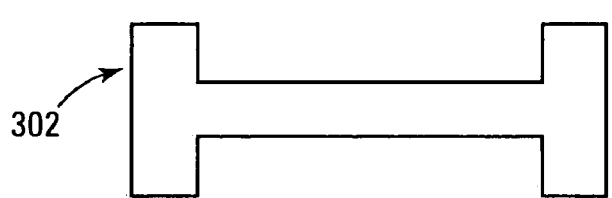
FIG. 3A is a side elevation view of one of the sleeves of FIG. 3.
Figure 3C:
FIG. 3C is a front elevation view of a sleeve according to another embodiment of the present invention.
Figure 3D:
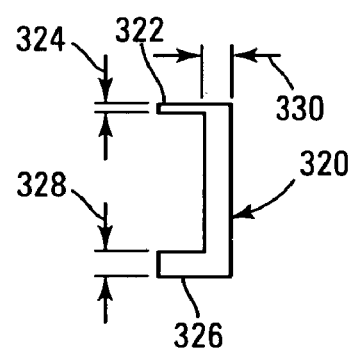
FIG. 3D is a side elevation view of a sleeve according to another embodiment of the present invention.

A side elevation view of the sleeve 302 of FIG. 3 is shown in FIG. 3A, and a front elevation view of sleeve 302 is shown in FIG. 3B. In order to accommodate different drive dimensions, and to allow some rotation and translation of the drive position, any of the internal dimensions of the sleeves 302 may be varied while keeping the external dimensions consistent with the dimensions of the oversize drive bay. Foe example, FIG. 3C shows a sleeve 310 that has been modified to rotate a mounted drive somewhat. The center beam 312 of sleeve 310 is molded or otherwise manufactured having an offset from front 314 to back 316 to mount a drive at a slight angle. Similarly, FIG. 3D shows a side elevation view of a sleeve 320 that has three different widths of the sleeve 320. At top arm 322 of sleeve 320, the width 324 of the sleeve is less than the width 328 of the bottom arm 326 of the sleeve 320. Further, the width 330 of the main body including the center arm of sleeve 320 can be adjusted. With all of the adjustments, and combinations thereof, it is possible to control pitch, roll, yaw, and various translations of a drive to correctly mount the drive without requiring hand mounting and fine adjustment. Each drive is shipped or provided with a pair of sleeves such as sleeves 302, 310, or 320 that allow a user to simply slide the sleeves around the drive and slide the drive and the sleeves into the oversized drive bay for proper alignment.

Figure 3E:
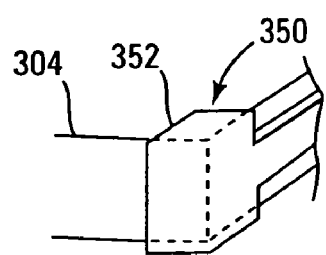
FIG. 3E is a perspective view of a sleeve according to another embodiment of the present invention.

Another embodiment of a sleeve 350 is shown in FIG. 3E. Sleeve 350 has a forward arm 352 that is formed to slide over the front end of a drive such as drive 304, to more fully seat the drive without the need for mounting screws or the like. It should be understood that one or more of the modifications to sleeves, such as varying the widths and thicknesses, angles of center beams, and the like, are within the scope of the invention, and that such changes to the inner dimensions are not limited to those discussed herein, but in fact encompass any modifications to the inner dimensions of the sleeves to provide proper translation and rotation to mount any drive that fits within the oversized drive bay.

Figure 4:
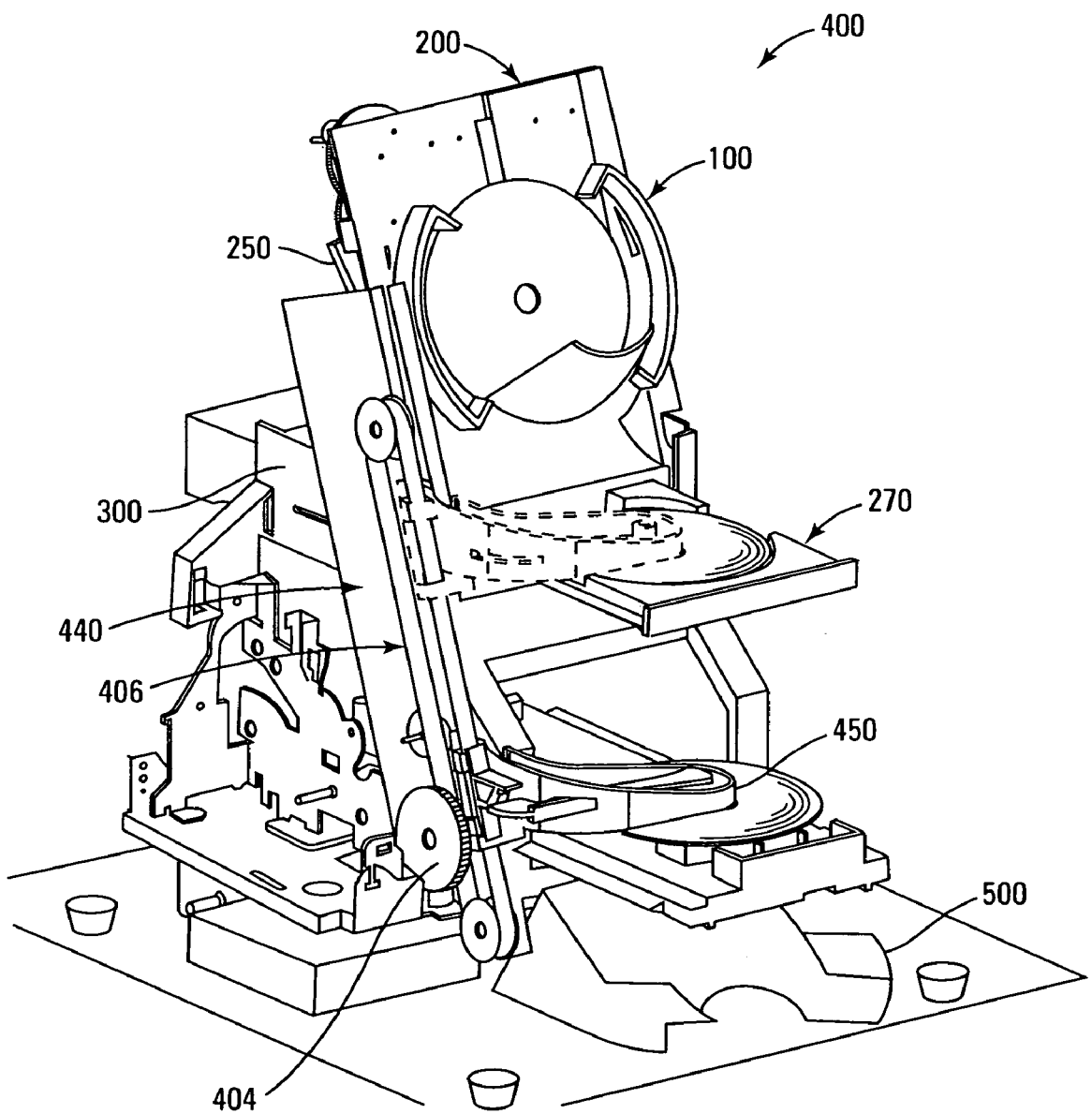
FIG. 4 is a perspective view of a multiple media printer according to another embodiment of the present invention.

One embodiment of a multi media printer 400 is shown in greater detail in FIG. 4. System 400 comprises generally an input bin 100 positioned near feed chute 250 and singulator 200. Beneath singulator 200, feed chute 250, and input bin 100 is recorder 270 mounted in drive mounting system 300. Angled motion picker body 450 is shown on belt and pulley system 406 in two different locations, near recorder 270 and near a printer below recorder 270 and about output bin 500.

One embodiment of an angled motion picker 440 is shown in greater detail in FIG. 4. Angled motion picker 440 comprises in one embodiment a DC motor 402, a gear reduction 404, a belt and pulley drive 406, an encoder 408, a linear rail 410, and a picker body 450. The picker body 450 is in one embodiment a friction grab picker. A single spring loaded finger provides a grip for this passive picker. No electronics are required on the picker, reducing the complexity of the picker. Picker body 450 comprises in one embodiment a clip 460, an arm 470 holding an actuator 480 and a gripping finger 490. The arm 470 mounts the actuator 480 and gripping finger 490, and along with the clip 460, also integral to the picker body 450, the entire assembly moves with the belt 432 of belt and pulley drive 406 guided by rail 410.

Figure 4A:
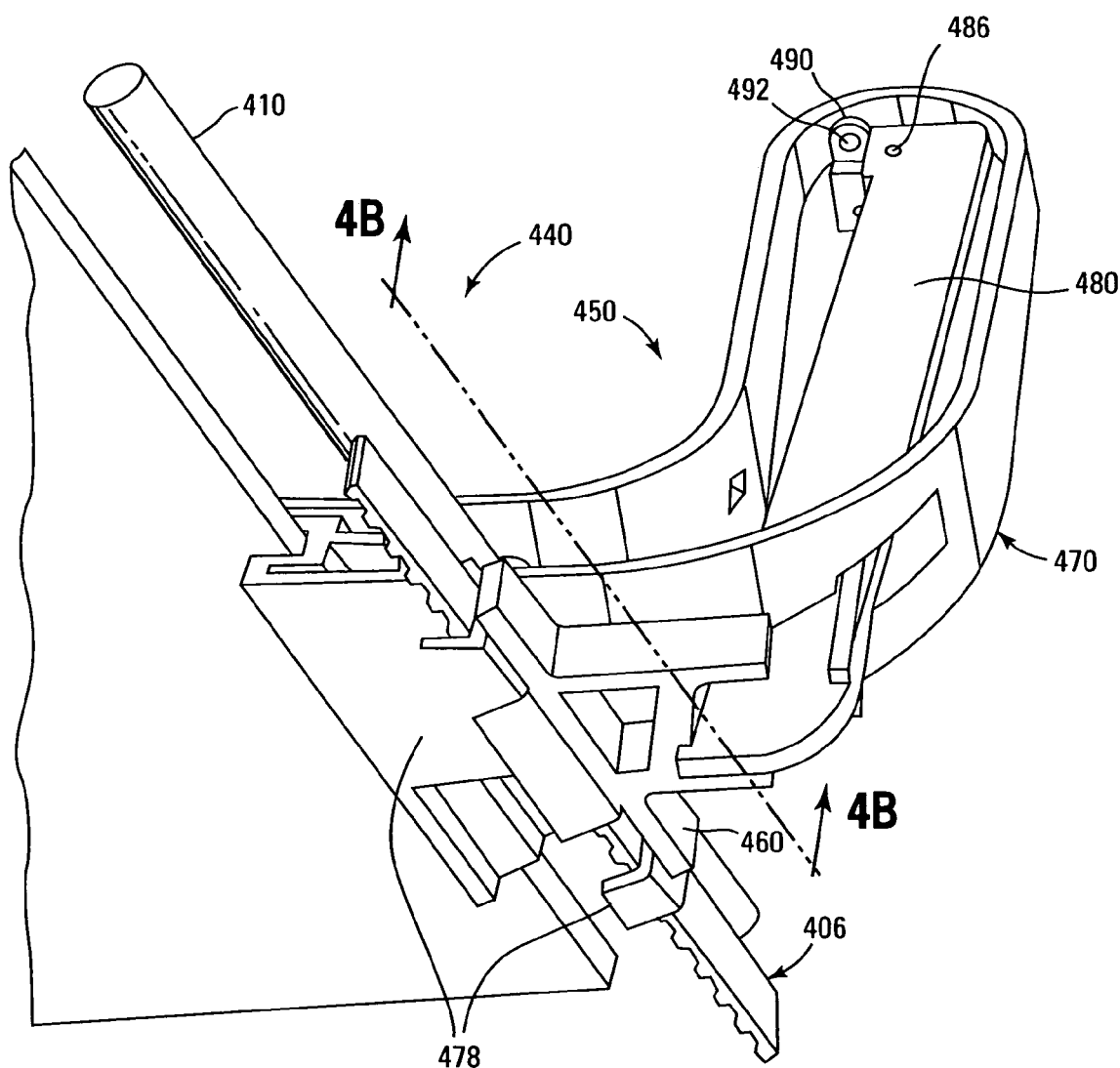
FIG. 4A is a perspective view of a picker according to another embodiment of the present invention.
Figure 4B:
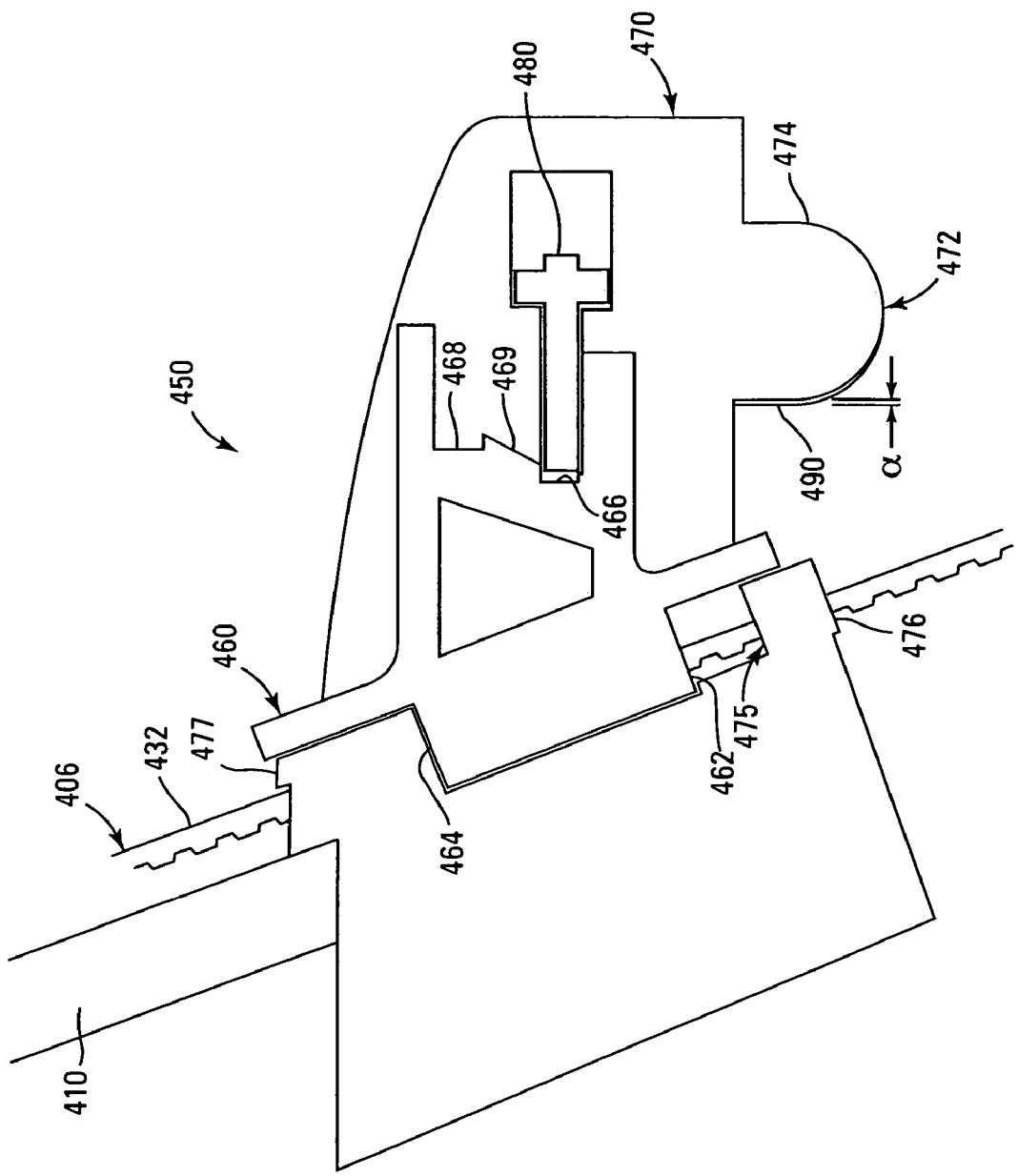
FIG. 4B is a side elevation view of the picker of FIG. 4A taken along lines 4B-4B thereof.
Figure 4C:
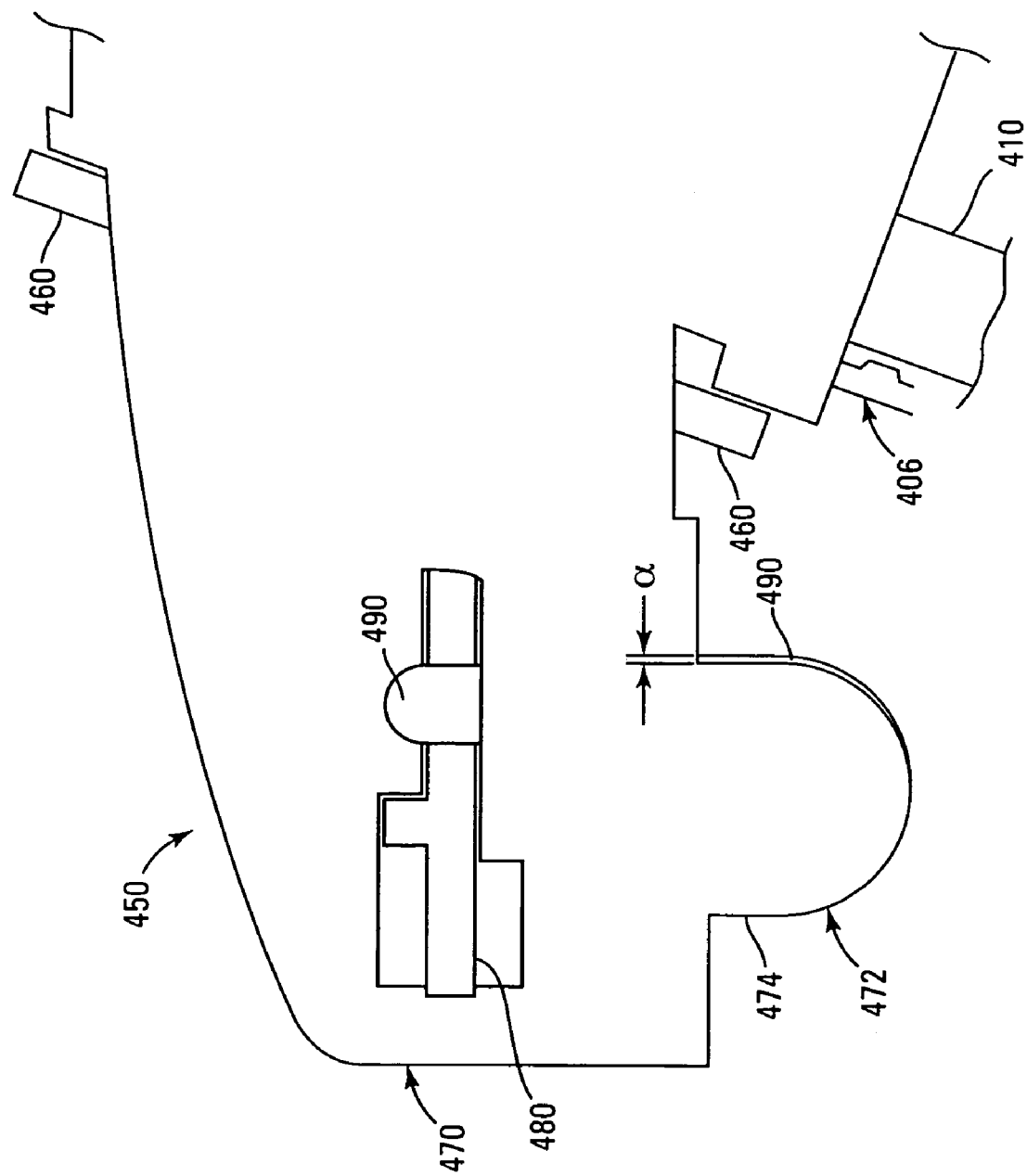
FIG. 4C is a reverse angle view of a part of the picker of FIG. 4B.
Figure 4D:
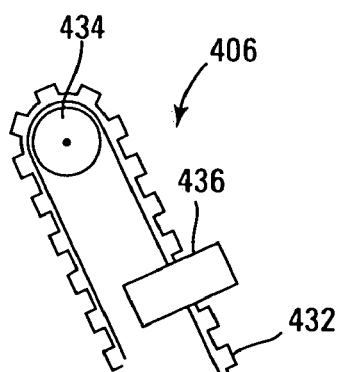
FIG. 4D is a view of a belt and pulley system according to another embodiment of the present invention.
Figure 4G:
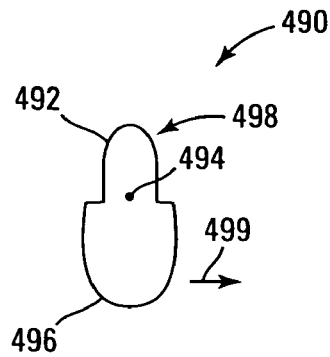
FIG. 4G is a side elevation view of a gripping finger according to another embodiment of the present invention.

Belt and pulley drive 406 comprises belt 432 moved by motion of pulley members 434. Clip 460 is affixed to belt 432 and moves when belt 432 moves. Clip 460 is connected to and moves with arm 470, which houses actuator 480 and gripping finger 490 as shown in greater detail in FIGS. 4A, 4B, and 4C, which are views of the picker 410 and its operation. Further details of each of the components of the picker 410 are shown in FIGS. 4D, 4E, 4F, and 4G below.

Figure 4E:
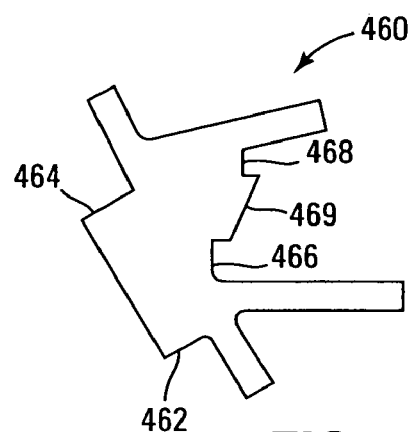
FIG. 4E is a side elevation view of a clip of a picker according to another embodiment of the present invention.
Figure 4F:
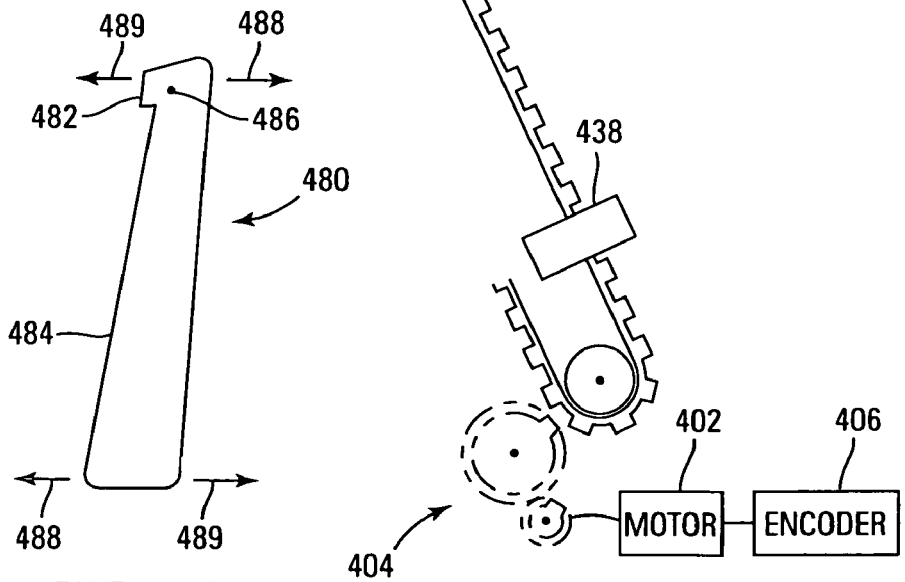
FIG. 4F is a top view of an actuator of a picker according to another embodiment of the present invention.

As has been mentioned, picker body 450 is fastened via clip 460 to belt 432 of belt and pulley system 406. Arm 470, connected to clip 460, rides along linear rail 410, with arm 470 having an opening through which linear rail 410 passes so as to maintain alignment and movement of picker body 450 in a linear motion parallel to the axis of linear rail 410. Referring now also to FIG. 4E, clip 460 has a pair of flat stop surfaces 462 and 464, and a pair of notches 466 and 468. Surface 484 of actuator 480 rests in one or the other of notches 466 or 468 when the belt and therefore the picker are in motion. For the picker body 450 to be in a gripping position, surface 484 of actuator 480 is in notch 466 of clip 460, and therefore actuator 480 is rotated about pivot point 486 in the direction of arrows 488 (FIG. 4F). Gripping finger is in a biased position so that the bottom 496 of finger 490 extends out a distance a from downwardly extending protrusion 472 of arm 470. This distance is in one embodiment approximately 10/1000 of an inch. The extended finger portion 496 and the opposite side 474 of protrusion 472 are sufficiently spaced so as to grip a disc by its center opening for carrying and transport by the picker. Further, arm 470 has stop members 475 and 477. When the picker body 450 is in motion downward, stop member 475 of arm 470 abuts a stop member 438 on belt and pulley system 406 as belt 432 moves. To release a gripped disc from the picker 440, the belt 432 is moved downward until arm stop surface 476 hits stop member 438, stopping motion of arm 470. Clip 460 continues to move as the belt 432 is overdriven, snapping the actuator 480 from its gripping position in notch 466 to its release position in notch 468.

To set the actuator into the notches 466 and 468, it is necessary in one embodiment to overdrive the belt once the respective arm member 475 or 477 has contacted the respective stop member 438 or 436 of belt and pulley system 406, forcing the clip 460 to continue to move relative to the now stationary arm 470. Since translational motion of the picker body 450 stops when the arm 470 hits the stop member 438 or 436, the overdriving of the belt 432 and hence the clip 460 forces the actuator to slide along the surface 469 between the two notches 464 and 466 until it snaps into the other notch. Overdriving the belt when the arm 470 reaches stop member 438 results in releasing gripping by the gripping finger by snapping the actuator 480 from notch 466 to notch 468. This action pivots actuator 480 about pivot point 486 in the direction of arrows 489. In contrast, overdriving the belt when the arm 470 reaches stop member 436 results in engaging gripping by the gripping finger by snapping the actuator from notch 468 to notch 466. This action pivots actuator 480 about pivot point 486 in the direction of arrows 488. A spring (not shown) may be used to assist in the retraction of the actuator.

In operation, the system 400 operates as follows. A stack of discs to be recorded and/or printed is stacked in the input bin. The configuration of the input bin forces a few discs of the stack into proper singulating position. The singulator operates to pick a single disc from the back of the input bin, lifting the disc by its center opening until a predetermined point is reached, where the singulating member retracts, and the disc is released. The disc falls into the feed chute, and drops into open recording tray of the recorder. Once recording is complete, the picker is placed in its gripping position, and removes the disc from the recorder tray. At this time, the singulator has been instructed to singulate another disc from the input bin, and once the disc from the recorder tray is picked, the singulator drops another disc into the recording tray. The recording tray retracts, and the picker body moves along the linear rail to its release position, where the disc is released, either to the printer or to the output bin (described below). The process shortens idle time for the recorder by removing picking as a requirement for placing a disc in the recorder.

Figure 5:
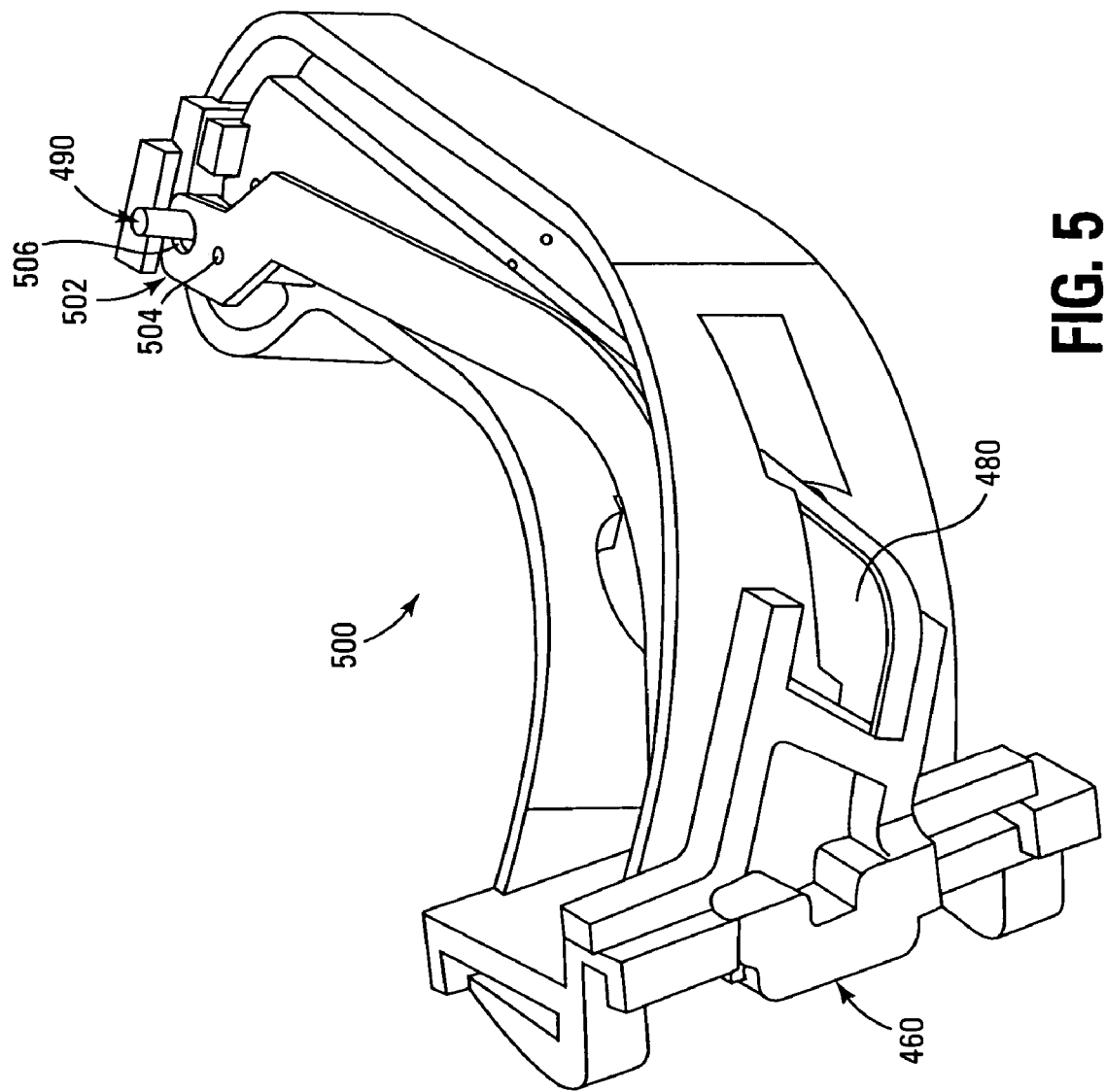
FIGS. 5, 5A, and 5B are views of an another embodiment of a picker.
Figure 5A:
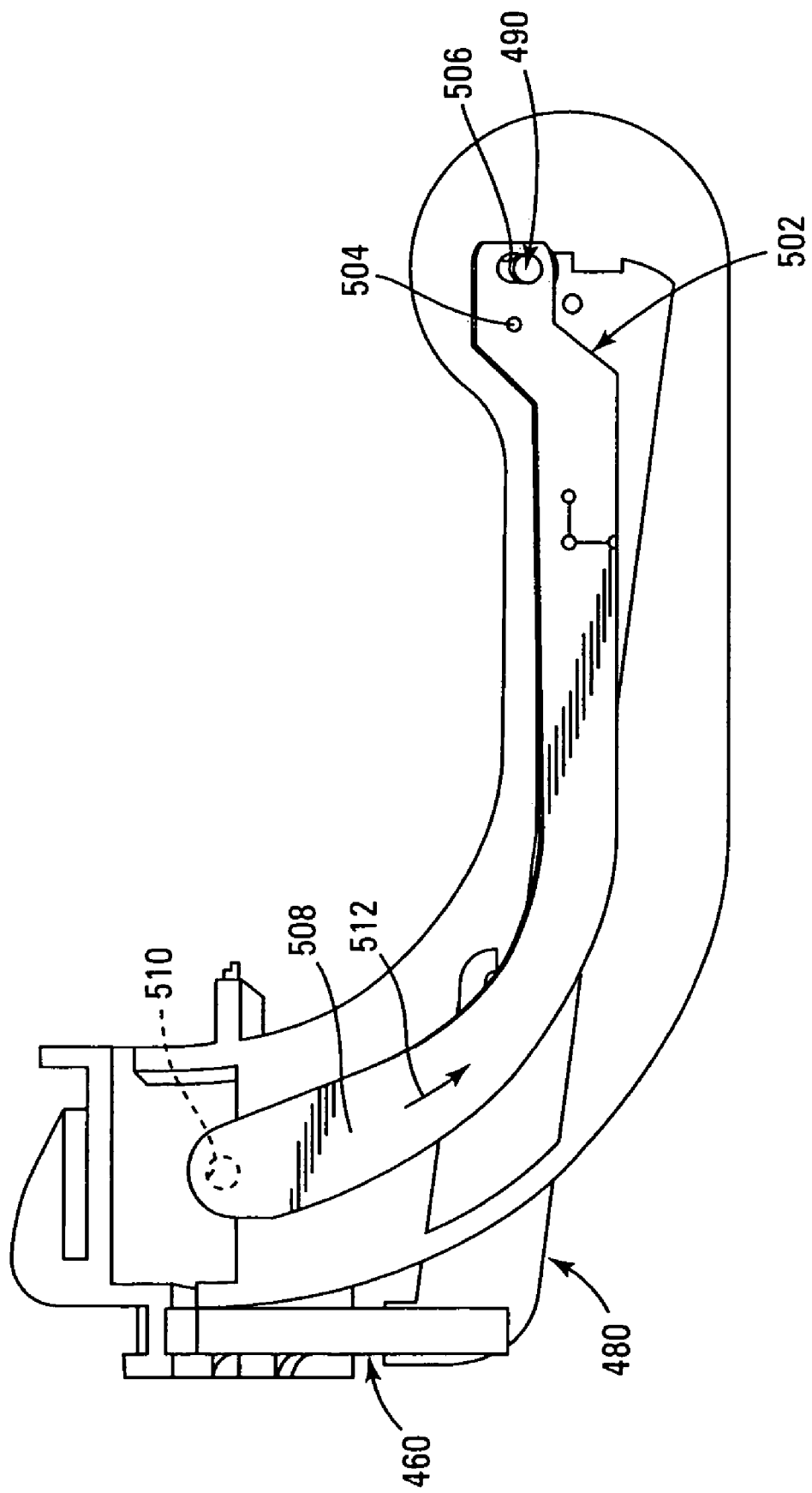
Figure 5B:
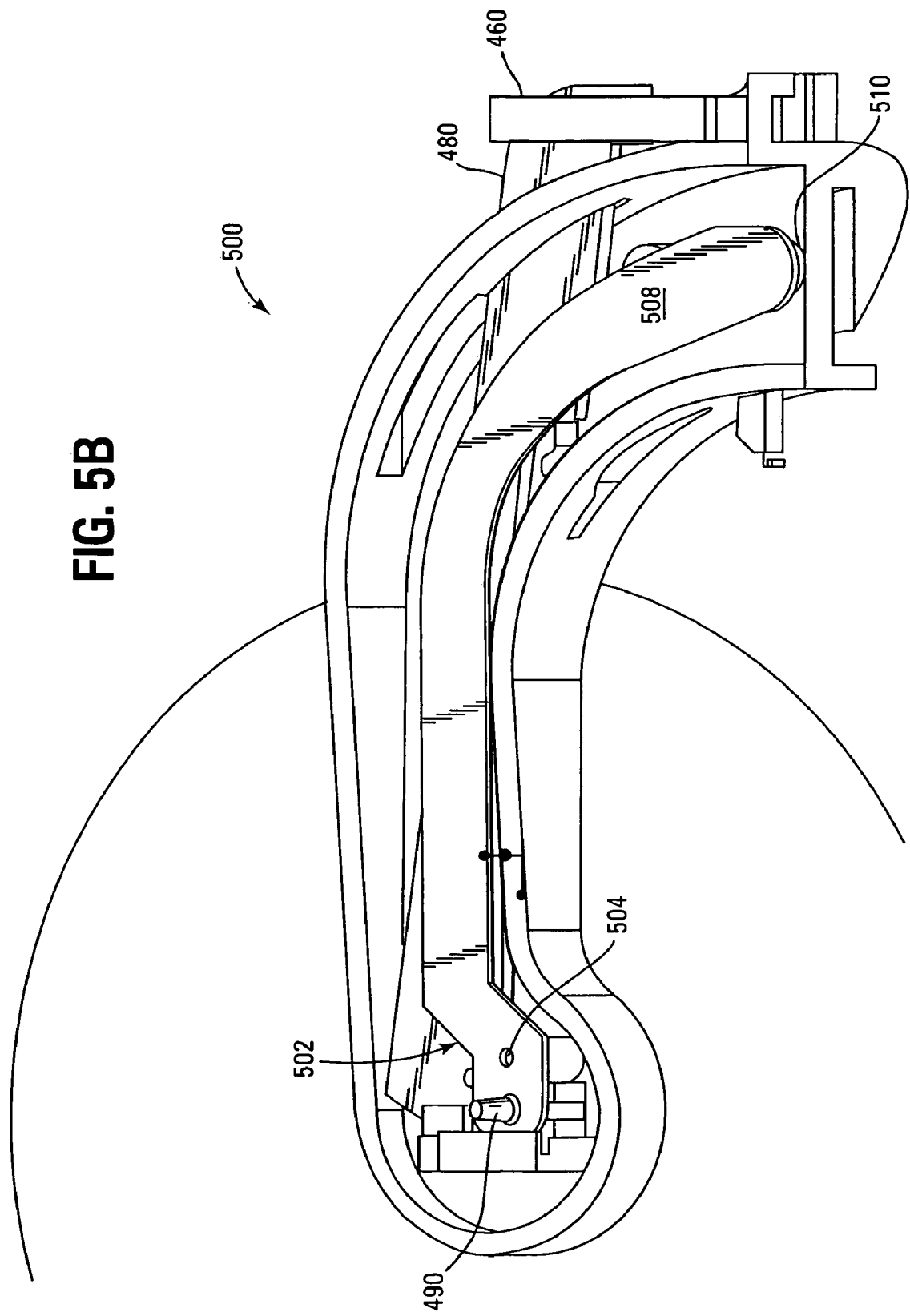

Another embodiment of an arm 500 is shown in FIGS. 5, 5A, and 5B. For purposes of these Figures, like reference numerals indicate like parts from previous figures. Arm 500 has an additional sensor finger 502 which is disposed above actuator 480 in arm 500. Sensor finger 502 pivots about pivot point 504 in counter-motion to actuator 480. Opening 506 in sensor arm 502 receives the top of finger 490. When finger 490 moves due to the rotation of actuator 480 (as described above), sensor arm 502 rotates in the opposite direction as actuator 480. When sensor arm 502 rotates in the direction of arrow 512, opening 510 in arm 500 is uncovered. In this embodiment, an infrared transmitter is positioned along the axis normal to the surface of sensor arm 502 through the center of opening 510. An infrared receiver is positioned on the opposite side of the opening 510 as the infrared transmitter. When the infrared sensor receives a signal from the infrared transmitter, that is an indication that the actuator has properly moved from the gripping position to the release position. In this manner, error conditions can be checked for the gripping and release positions of the arm 500.

It should be understood that other transmitting and detecting schemes are within the scope of the invention, including by way of example only and not by way of limitation, visible light, laser light, and the like.

Figure 6:
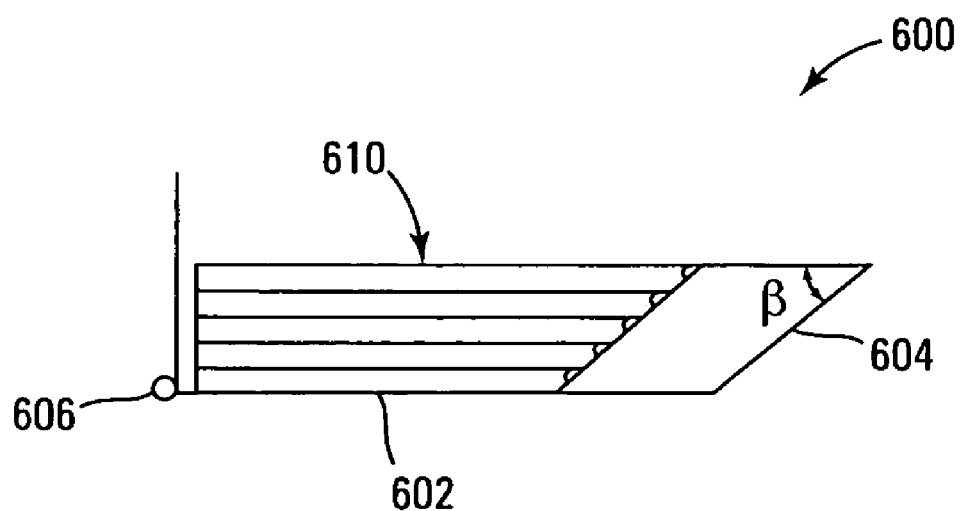
FIGS. 6 and 6A are side views of an output bin in two positions according to another embodiment of the present invention.
Figure 6A:
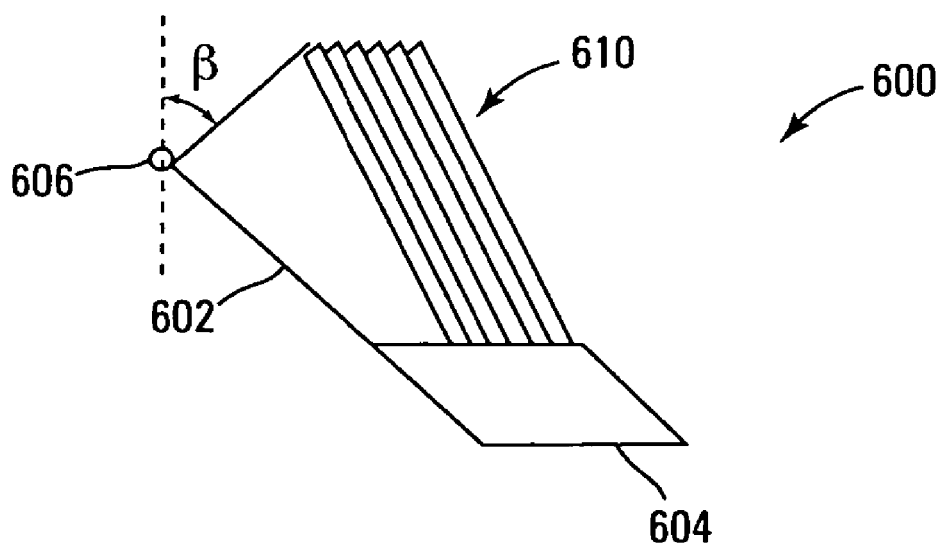

One embodiment of an output bin 600 is shown in greater detail in FIGS. 6 and 6A. Output bin 600 comprises a bin body 602 having disc retaining walls 604 for holding a stack of discs such as stack 610. In one embodiment, when the stack 610 reaches a certain weight, a spring 606 biasing output bin 600 to a substantially horizontal position as shown in FIG. 6 has its spring force overcome, and the output bin 600 rotates downward an angle of β to its delivery or retrieval position as shown in FIG. 6A. In one embodiment, β is approximately 30 degrees. At this orientation of output bin 600, the stack of discs 610 is presented at an angle of approximately 30 degrees for easy retrieval from the output bin 600.

It should be understood that in other embodiments, the mechanism by which output bin 600 rotates can be changed without departing from the scope of the invention. For example, in another embodiment, the output bin is motorized to move between its first and second positions. In this embodiment, the system 400 tracks the number of discs that have been deposited in output bin 600. Once a predetermined number of discs is reached, the motor lowers the output bin for disc retrieval. It should be understood that a straight angled drop could also be used, eliminating an output bin altogether, without departing from the scope of the invention.

Figure 7:
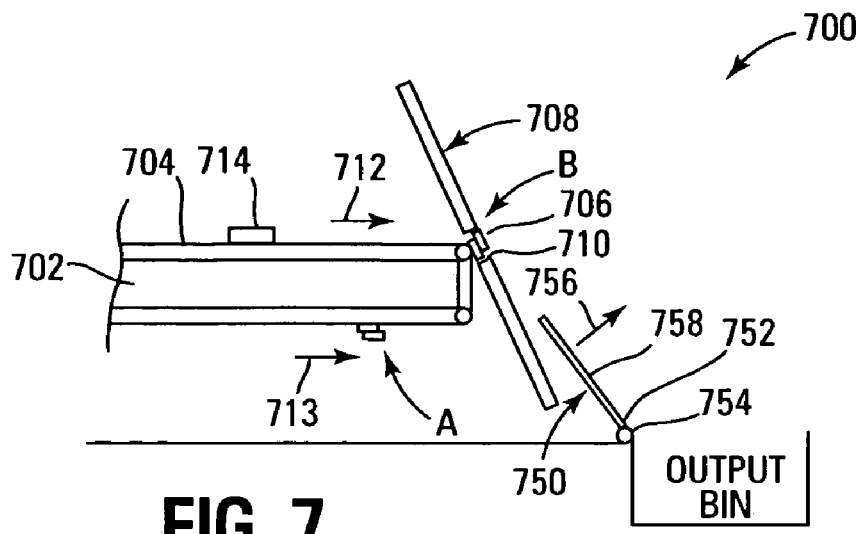
FIG. 7 is a side view of a button picker according to another embodiment of the present invention.
Figure 7A:
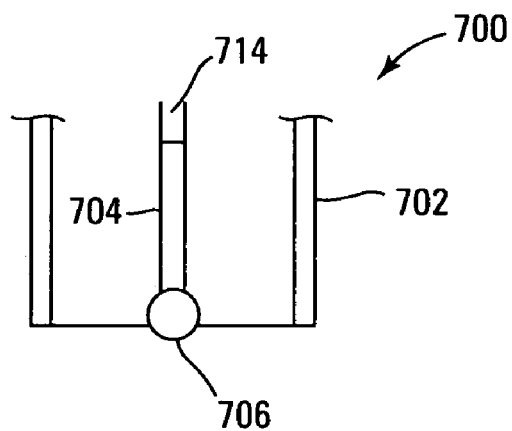
FIG. 7A is a top view of the button picker of FIG. 6.
Figure 7B:
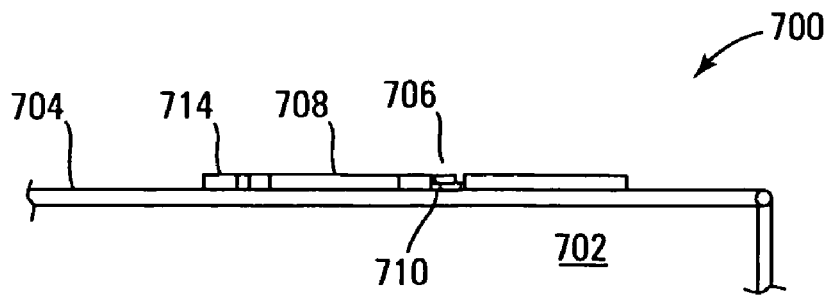
FIG. 7B is a side elevation view of a portion of a button picker gripping a disc according to another embodiment of the present invention.

FIG. 7 shows a printer belt picker embodiment 700. Belt picker 700 comprises a printer bed 702 on which moves a belt 704 or other conveyance mechanism. In this embodiment, belt 704 has affixed thereto a button 706. The button is positioned central to the belt as is shown best in FIG. 7A. The button 706 in one embodiment is sized so that its diameter is slightly smaller than the diameter of a compact disc center opening. A picker or other disc transport device, including a gravity feed device, can deposit a disc 708 having center opening 710 in leaning relation to the belt 704. The belt 704 is advanced in the direction of arrow 712 until the button 706 is in a position past where a disc center opening 710 will be, such as position A shown in FIG. 7. When a disc is positioned for picking, the belt is advanced in the direction of arrow 713 until button 706 engages center opening 710 of disc 708 (position B), gripping disc 708. Then the belt 704 continues to lift disc 708 onto the bed 702 as is shown in FIG. 7B. Printing is effected, and the disc 708 is pushed off belt 704 and button 706 in one embodiment by pusher 714, which is integral to the belt 704 and advances when the disc is in the position shown in FIG. 7 to disengage disc 708 from button 706, pushing disc 708 away from printer, in one embodiment into an output bin such as bin 600.

In another embodiment, a spring loaded door 750 is positioned in the arc of a disc that is being picked up from its leaning position described above. The door 750 is biased by a coil spring 752 or the like to the position shown in FIG. 7. Door 750 is rotatable about pivot point 754 in the direction shown by arrow 756 when a disc is being picked by the button picker. The disc contacts the door 750 and rotates the door sufficiently far to allow the disc to be pulled into the printer. When the disc clears the arc of the door 750, the spring force from spring 752 biases the door to its original position. When the disc is subsequently pushed from the belt by pusher 714, the disc slides along the top 758 of the door 750 into an output bin or the like.

Figure 8:
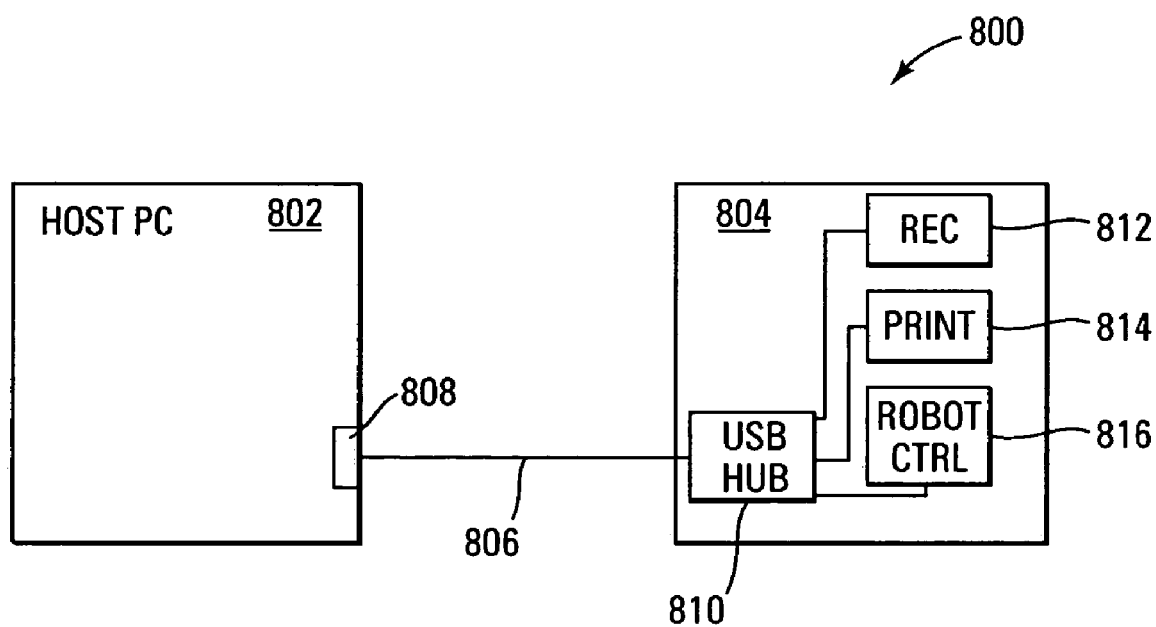
FIG. 8 is a block diagram of a system according to another embodiment of the present invention.

FIG. 8 is a block diagram of a computer system 800 comprising a host computer 802 connected to a printer/recorder system 804 (or system 400). Connection of the computer 802 and the printer/recorder 804 is by any suitable connection including but not limited to Universal Serial Bus (USB), parallel, serial, wireless, or wired network connection 806. As shown, connection 806 is between a USB port 808 on computer 802 and USB hub 810 of printer/recorder 804. Component devices in printer/recorder 804 include by way of example recorder 812 for writing information to discs, printer 814 for printing labels on discs, and robot controller 816 for operating the functions of components such as pickers, singulators, and the like.

In one embodiment, computer 802 runs a software program that identifies the system 804 by polling the components connected to the USB hub 810, and identifying the system by the configuration of components.

It should be understood that the number of recorders in systems of the present invention can be increased without departing from the scope of the invention. The motion of the picker body and the passive nature of the device are best embodied in a system with two locations for the picker to move between, but modifications will be apparent to those of skill in the art, and such modifications are within the scope of the invention. Further, the various components of the present invention need not all be present on any system, and individual components of the present invention are amenable to use on other systems. For example, a gravity feed chute and singulator can be used on a system with an active picker, or a passive picker may be used on a system without a singulator of the present type, and so forth, without departing from the scope of the invention.

CONCLUSION

A system, components, and processes have been described that include an input bin, a singulator, a gravity feed system for discs, a passive picker that requires no electronics for operation, a drive mounting system that mounts multiple drives without the need for hand adjustment, a belt picker for a printer or the like, and an output bin, as well as a system incorporating the individual components. The system and processes reduce idle time for a recorder of the system, and reduces the need for an active picker, thereby reducing cost while improving efficiency.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A belt picker for a disk processing system comprising:
   a bed having a top surface and a bottom surface and a distal end;
   a belt passed over at least a portion of the top surface of the bed, around the distal end of the top surface, and over at least a portion of the bottom surface of the bed, the belt being coupled to a drive for moving the belt linearly along the bed;
   a pickup button secured to a first portion of the belt and moveable in a linear fashion with the belt between a first and a second position in which the pickup button is positioned on the bottom surface of the bed in its first position and is positioned on the upper surface of the bed in its second position, the pickup button being smaller than the diameter of the center hole of a disk; and,
   a pusher secured to a second portion of the belt and spaced apart from the pickup button by at least the radius of a disk at a position relative to the pickup button in the direction in which the pickup button moves from its first to its second position, the pusher being moveable in a linear fashion with the belt.

2. The belt picker for a disk processing system of claim 1 wherein the bed is positioned with respect to a base of the disk processing system such that the center hole of a disk supported on the base is engaged by the pickup button as the pickup button moves between its first and its second positions, the disk being consequently moved by the pickup button to a position on the upper surface of the bed wherein the disk is substantially centered over the pickup button in its second position.

3. The belt picker for a disk processing system of claim 1 wherein the top surface of the bed is positioned above the base no less than the distance between the center hole and the edge of a disk of the type processed by the disk processing system.

4. The belt picker for a disk processing system of claim 1 wherein the top surface of the bed is positioned above the base no more than ⅔ of the diameter of a disk of the type processed by the disk processing system.

5. The belt picker for a disk processing system of claim 1 further comprising a deflector positioned adjacent the distal end of the bed.

6. The belt picker for a disk processing system of claim 5 wherein the deflector is moveable between a first position in which the deflector may receive thereon a portion of the disk such that the disk, upon being released onto the deflector, will be directed to a desired location, and a second position, in which the deflector is positioned away from the distal end of the bed such that a disk engaged by the pickup button will not be dislodged by the deflector.

7. The belt picker for a disk processing system of claim 1 wherein the pickup button further comprises a hook that extends from the pickup button generally parallel to the belt and in the direction in which the pickup button moves from its first position to its second position.

8. The belt picker for a disk processing system of claim 7 wherein the hook of the pickup button is offset from the belt a distance that is smaller than the thickness of a disk of a type processed by the disk processing system.

9. The belt picker for a disk processing system of claim 7 wherein the hook of the pickup button is of an elastomeric material.

10. A disk printer comprising:
    a tray having a top surface, a bottom surface, a proximal end and a distal end;
    a belt passed around the top, distal, bottom, and proximal ends of the tray in a continuous loop, the belt being coupled to a drive mechanism for moving the belt in a linear manner around the tray;
    a pickup button secured to a first portion of the belt and moveable in a linear fashion with the belt between a first and a second position in which the pickup button is positioned on the bottom surface of the tray in its first position and is positioned on the upper surface of the tray in its second position, the pickup button being smaller than the diameter of the center hole of a disk; and, a pusher secured to a second portion of the belt and spaced apart from the pickup button by at least the radius of a disk at a position relative to the pickup button in the direction in which the pickup button moves from its first to its second position, the pusher being moveable in a linear fashion with the belt.

11. The disk printer of claim 10 further comprising a deflector positioned adjacent the distal end of the bed.

12. The disk printer of claim 11 further comprising an output bin positioned adjacent to the deflector to receive disks placed on the deflector by the pickup button of the belt.

13. The disk printer of claim 12 wherein the output bin comprises:

a bin body having a bottom hingedly coupled to a substrate (chassis/frame/base), a pair of lateral containment members (walls) coupled to the lateral edges of the bottom of the bin body and extending generally upward from the bottom of the bin body, and a back wall extending from a back edge of the bin body bottom at an angle thereto, the bottom, lateral containment members, and back wall forming a holder for one or more discs; and, a biasing mechanism coupled between the substrate and the bin body such that the bin body is biased toward a first position, the biasing mechanism being adapted to rotate the body bin to a second position where a predetermined force is placed on the bin body.

14. A method of feeding disks into a disk processing system comprising:

placing a disk in an angled posture adjacent a distal end of a tray of the disk processing system;

actuating a belt drive that is passed around the distal end of the tray such that the belt drive moves a pickup button secured thereto into engaging contact with a center hole of the disk;

driving the belt drive until the disk engaged by the pickup button is lifted onto a top surface of the tray and into a predetermined position;

performing a disk processing step on the disk while it is in its predetermined position on the top surface of the tray;

driving the belt in the direction opposite the direction taken to move the disk into its predetermined position on the top surface of the tray such that as the pick up button nears the distal end of the tray, a leading edge of the disk will be positioned over a deflector; and, driving the belt in the direction opposite the direction taken to move the disk into its predetermined position on the top surface of the tray until the disk is supported by the tray and the deflector and the pickup button is moved out of engagement with the center hole of the disk.

15. The method of feeding disks into a disk processing system of claim 14 further comprising pushing a trailing edge of the disk with a pusher attached to the belt until the disk is deposited onto the deflector.

* * * * *